United States Patent

Stratford

[11] Patent Number: 5,154,324
[45] Date of Patent: Oct. 13, 1992

[54] BELT MOUNTED PORTABLE DISPENSING SYSTEM FOR VETERINARY FLUIDS

[75] Inventor: Michael G. Stratford, Berkhamsted, England

[73] Assignee: Coopers Animal Health Limited, Berkhamsted, United Kingdom

[21] Appl. No.: 560,042

[22] Filed: Jul. 30, 1990

[30] Foreign Application Priority Data

Jul. 31, 1989 [GB] United Kingdom ............ 8917464
Apr. 19, 1990 [GB] United Kingdom ............ 9008758

[51] Int. Cl.⁵ .................................................. B67D 5/64
[52] U.S. Cl. ................................. 222/175; 222/464; 222/529; 224/148; 224/252
[58] Field of Search ........... 222/175, 464, 325, 479, 222/481.5, 529, 532; 604/179; 224/148, 252, 253; 239/152-154

[56] References Cited

U.S. PATENT DOCUMENTS

| | | | |
|---|---|---|---|
| 3,305,144 | 2/1967 | Beres et al. | 222/529 X |
| 3,902,652 | 9/1975 | Malcolm | 222/566 |
| 4,090,650 | 5/1978 | Gotta | 224/5 |
| 4,141,477 | 2/1979 | Hengesbach | 222/529 X |
| 4,449,654 | 5/1984 | Cappis | 224/148 |
| 4,470,526 | 9/1984 | Cha et al. | 222/320 |
| 4,526,298 | 7/1985 | Boxer et al. | 222/130 |
| 4,544,087 | 10/1985 | Modig | 224/148 |
| 4,588,116 | 5/1986 | Litman | 224/253 |
| 4,629,098 | 12/1986 | Eger | 222/175 |
| 4,662,551 | 5/1987 | Dudley et al. | 224/211 |
| 4,759,475 | 7/1988 | Munthe | 222/464 |
| 4,826,050 | 5/1989 | Murphy et al. | 222/175 |
| 4,848,660 | 7/1989 | O'Connell | 239/154 |
| 4,865,224 | 9/1989 | Streck | 222/95 |
| 4,898,308 | 2/1990 | Rudick | 222/481.5 X |
| 4,905,882 | 3/1990 | Ross | 224/148 X |

FOREIGN PATENT DOCUMENTS

| | | |
|---|---|---|
| 0124359 | 11/1984 | European Pat. Off. |
| 0276903 | 8/1988 | European Pat. Off. |
| 2059750 | 4/1981 | United Kingdom |
| 2150814 | 7/1985 | United Kingdom |
| 2213127 | 8/1989 | United Kingdom |

*Primary Examiner*—Gregory L. Huson

[57] ABSTRACT

A portable dispensing system for administering fluids to livestock (e.g. vaccines, drenches/pour-ons) comprising a pack (1) for fluid materials attached to the operator by a belt. In use, fluid is drawn from the interior of the pack via a dip tube (7) and through a flexible delivery tube (10) by repeated operation of a dispensing syringe or gun (12). The dip tube and delivery tube are coupled via a connector in a draw-off cap (8). When not in use the gun can be attached to the pack by a clip or holster (18).

3 Claims, 4 Drawing Sheets

BELT MOUNTED PORTABLE DISPENSING SYSTEM FOR VETERINARY FLUIDS

The present invention relates to a portable dispensing system for fluid materials which is worn around the hip or waist of the operator. The invention is more particularly concerned with dispensing systems for administering fluids to livestock and is accordingly described in this context.

In situations where individual operators are dispensing predetermined volumes of fluids in a repetitive fashion, it is convenient if the supply of fluid to be dispensed is continuously supplied to the dispensing device such that after each fluid dose is dispensed, the dispensing device is automatically replenished. Typical dispensing devices include syringes, guns, applicators as well as other dispensing or administering means.

A portable dispensing system is desirable and is ideally carried about the operator's body for greater mobility and maximum operator freedom. Such considerations are particularly relevant to operations in an agricultural context where, for example, dispensing of fluids (e.g. medicaments, nutritional supplements etc.) occurs in the vaccinating, drenching or dosing of livestock as well as in the administration of "pour-on" products to livestock, udder washing, and in the use of intra-ruminal injectors and for intramuscular injections [for example, for administering porcine somatotrophin, (PST)]. Maximum operator freedom is very important when a large number of individual doses have to be carried out at any one time and where the stock personnel are needed both to administer and to restrain the animals in question. Furthermore, in order to allow for the somewhat unpredictable and uncooperative nature of livestock during such operations, a particularly robust system is called for which minimises the risks of both operator and target animal becoming tangled in the dispensing apparatus.

The most basic systems presently used in the agricultural livestock industry typically consist of a dispensing syringe or gun which is replenished with fluid medicament through flexible delivery tubing which connects with a supply of fluid medicament such as for example, any one of a number of commercially available ready-filled medicament packs, cartridges, or containers. The ready-filled medicament packs generally have thin plastic walls which collapse as the fluid is removed and are often disposable. In use, the packs are commonly worn round the operator's neck by means of a loop or the like. Unfortunately, there is a tendency for the pack to dangle when the operator bends and for the somewhat fragile pack to get caught or split and there is a real danger that the delivery tubing will become tangled up in the operator or target animal.

GB 2 150 814 B describes some general improvements on the basic type of system. This provides a specially adapted holder for a vaccine or drench cartridge which is secured to and carried on the arm of the operator such that the delivery tubing extends from the cartridge to the delivery syringe along the forearm of the operator. While the arrangement of the system on the arm of the operator offers less risk of the delivery tubing becoming tangled, there is a tendency for it to be initially uncomfortable for the user, if not distracting. Also, the results of leakages from the cartridge down the arm of the operator could be unpleasant. Furthermore, although there is some attraction in having a system to hold the cartridge in such an "out-of-the-way" fashion, it makes it inherently awkward to attach or detach the cartridge, even by the most ambidexterous user. This is particularly inconvenient when the operator is interrupted from dosing for any reason, or is trying to alternate dosing with other jobs such that it will be necessary to keep detaching the system from the arm. Indeed, the whole system becomes a problem when one arm of the operator is injured, absent or required for other activities such as restraining the animal to be administered.

According to the present invention a portable dispensing system is provided which comprises a pack (i.e. a fluid container) or the like for the fluid materials to be dispensed, dispensing means for administering material from the pack to the target and means for attaching the pack to the operator characterised in that the means for attaching the pack to the operator is a belt which secures the pack around the waist or hip of the operator. Suitably, the means for delivering the fluid from the pack to the dispensing device is a flexible coiled tube.

A major improvement of the present system is the secure and comfortable attachment of the pack to the operator. Most people are accustomed to wearing a belt and find it comfortable to wear. In addition the belt secures the pack firmly so that movement of the pack is minimal.

Simple belts are suitably made from a webbing material but other functional or hard wearing materials are easily substituted. The belt is fitted to the operator by any convenient or conventional means, e.g., strips of hook-and-loop materials such as VELCRO, a buckle or a clamp. The pack is fitted to the belt in such a way that it is readily accessible for attachment and detachment yet it is not in the way of the operator or the target animal.

Suitably, the pack has slots or loops for attachment to the belt or to lugs provided on the belt. The slots or loops can either be moulded in or attached to a retaining feature or supported by any other attaching means. For example, the pack may have fully formed flanges for location of the belt. One advantage of integrally-moulded split loops or slots is that they facilitate easy fitting and removal of the belt.

The pack is suitably constructed of a plastics material (e.g. polypropylene, low density polyethylene and high density polyethylene), preferably polypropylene, by blow-moulding or injection moulding processes, more suitably by blow-moulding. In a preferred aspect of the present invention the fluid container or pack is of a semi-rigid, largely non-collapsible construction which has the advantage that it is inherently less vulnerable and resists accidental puncturing and leakage. With a non-collapsible pack it means that the "panelling" phenomenon seen when flexible packs are emptying is absent. An important advantage with the present pack is that it is comparatively inert to even very aggressive chemicals and consequently the risks from seepage are low or absent.

Packs are suitably between 500 ml and 1 liter capacity. For convenience, the ready-made packs can be filled with the liquid to be dispensed and the packs sealed and stored if not immediately required. Therefore, ideally the pack is compatible with conventional filling equipment and modern closures and appropriately, the pack has a threaded (screw) neck. Suitable closures to seal the open end of the pack include in particular conduction heated foil seals.

Suitably, the pack is provided with a sump-like feature in its base into which is directed the end of a dip-tube which provides the means for drawing the fluid out of the pack. Preferably the sump is positioned centrally at the bottom of the pack. In operation, the provision of this sump-like feature allows the user to move freely yet keep the end of the dip-tube immersed in the fluid, preventing airlocks and ensuring that the maximum volume of fluid is dispensed from the pack. Suitably, the end of the dip tube rests on the bottom of the sump but is notched or otherwise shaped so as to permit fluid into the dip tube from the sump.

The dip-tube is suitably secured in place by attachment of the upper end of the dip-tube to a draw-off cap which fits securely to the neck of the pack. The draw-off cap can also provide an air inlet means with a non-return valve. Suitably this is a split (flexible) valve, a vaccine spike or the like. The non-return valve can also be provided by the remains of a foil seal if present.

The draw-off cap suitably provides a connection for the upper end of the dip-tube to a flexible coiled delivery tube which delivers the fluid out from the pack into a dispensing device.

A compression joint fitting may be used to join the flexible coiled delivery tube and dip tube to the bottle cap. However, any suitable connecting means can be used e.g. jubilee clips etc. A preferred means of connection is a brass connector (or similar) having at one end a spigot which projects outside the cap when the connector is fitted into a hole in the cap and onto which the coiled delivery tube is push fitted. Preferably the spigot is ridged so as to grip the delivery tube and resist its removal. A nut can then be tightened around the other end of the connector into which the dip tube is ultimately fitted, while still allowing the cap to rotate. To lock the threads of the nut and the connector, the nut is swaged over, for example, using a suitable tool. Therefore in use, the operator can rotate the cap on the bottle rather than having to rotate the bottle on the cap without the nut becoming loose. As alternatives to swaging, other suitable means for achieving this include using an adhesive such as Loctite, PVC tape (as used in plumbing) and lock nuts. Suitably, the dip tube can then be push fitted inside a cavity in the other end of the connector.

The use of the flexible coiled delivery tube significantly reduces the risk of the tube either tangling or getting caught up in the user or target animal. The flexible coiled delivery tube provided by the present invention is sufficiently flexible to extend when in use but has sufficient resilience or rigidity to return automatically to its condensed, compact form when not in use. The flexible delivery tube or hose is suitably made of a nylon or similar material with "memory" characteristics i.e. it has the property of returning to its former shape after flexing. This provides the springy, recoiling action of the flexible coiled delivery tube. (Thus the self-recoiling properties of the hose are somewhat analogous to the flex of a telephone or that of the coiled safety flex currently recommended for domestic kettles).

A further advantage of such a flexible coiled delivery tube is that if a suitable length of coil is employed it prevents the dispensing device (applicator gun or syringe) from falling to the ground if it is dropped or otherwise accidentally knocked from the hand.

It is always possible that through mis-use or excessive stretching of the tubing there can be some loss of the original springiness. However, a useful property of the coiled nylon tubing provided in the present invention lies in its ability to regain its original springy nature after over-stretching. This is achieved simply by threading one end of the coil through the lumen of the coil and thereby turning the whole coil inside out.

In operation, fluid is drawn from and passes out of the container under the force provided by the operation of the aforementioned dispensing means. This means or device is suitably a disposable syringe but other suitable applicators including serviceable dispensing devices, e.g. guns can equally be used. When not in use, the syringe or other administration device can be attached to the pack or to the belt by means of a clip device or other means (e.g. a holster) for holding the dispensing device. The locating of the dispensing device in the clip or holster and removing it is furthermore a simple, single-handed operation.

The shape of the clip or holster can be readily adapted to accommodate the particular dispensing device employed. Suitably, the clip or holster device may be moulded in as an integral part of the pack or attached to a retaining feature, or to the belt.

Suitably the holster is not an integral part of the pack but is adapted to be retained onto the pack, for example by having flexible flaps which when pushed through the slits in the pack spring out so as to secure the holster. Alternatively, the belt can be threaded through slots provided on the holster so as to secure the holster. The holster can also be secured by the bottle cap or by flanges which cover the pack slits so that when the belt is passed through the flanges and the slits the holster is retained.

The present invention further provides a dispensing system adapted or suitable for administering vaccines, (or similar) or ready-filled medicament packs. In these cases, the pack is suitably mounted in an upturned fashion so as to assist the drainage of fluid from the pack. Suitably, a vaccine spike or similar device is fitted into the draw off cap to allow air into the pack.

In another aspect of the invention, there is provided a method of administering fluid treatments to livestock using a dispensing system according to the present invention.

The present invention will now be described in more detail by way of preferred forms of the system and with reference to the accompanying illustrations in which.

Figure 1:
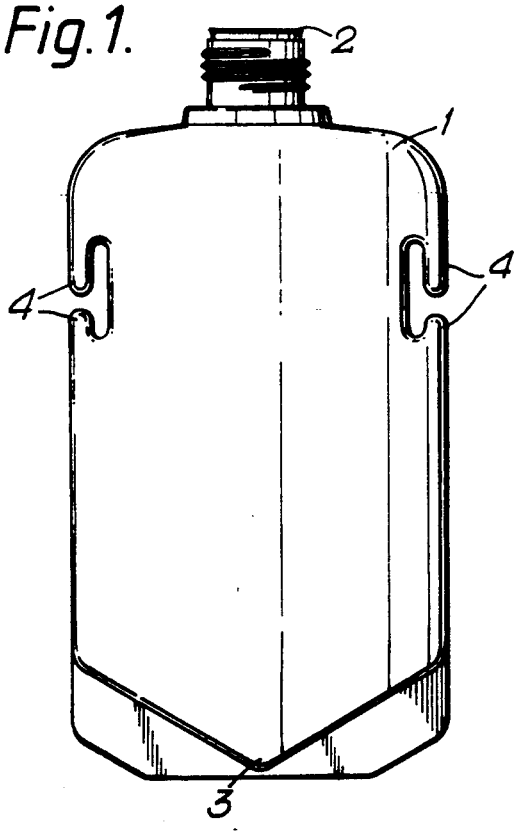
FIG. 1 is a perspective view of a pack according to the invention.
Figure 2:
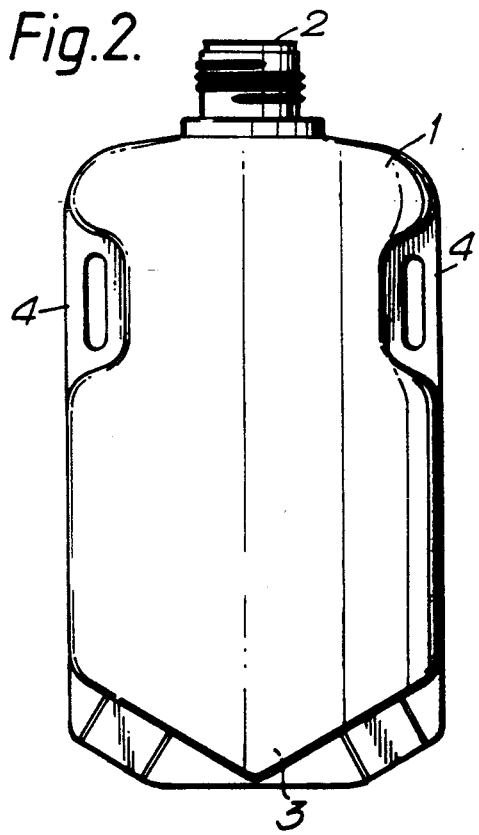
FIG. 2 is a perspective view of a second pack according to the invention.
Figure 3:
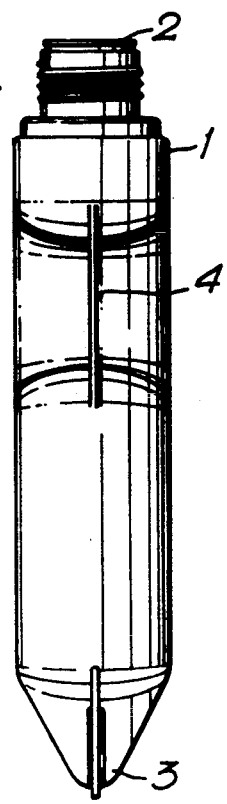
FIG. 3 is a side view of the pack in FIG. 2.

Fluid to be dispensed is contained in a pack (1) as shown in FIGS. 1 or 2. The pack is of approximately 600 ml capacity, constructed of plastics (polypropylene) material by a blow moulding process so as to provide a semi-rigid non-collapsible pack. The pack has a screw neck (2) which can be sealed with a foil closure prior to use. The base of the pack tapers to form a sump (3) which is centrally situated at the bottom of the pack.

The pack is attached to a belt by means of integrally moulded projections (4) that form slots which may be split as in FIG. 1. The belt can either be threaded through the slots, or slipped through the gaps left between the two ends of the projections forming the split slot of the pack in FIG. 1. Therefore attachment and detachment of the pack to the belt can be achieved without having to remove the belt from the operator.

Figure 4:
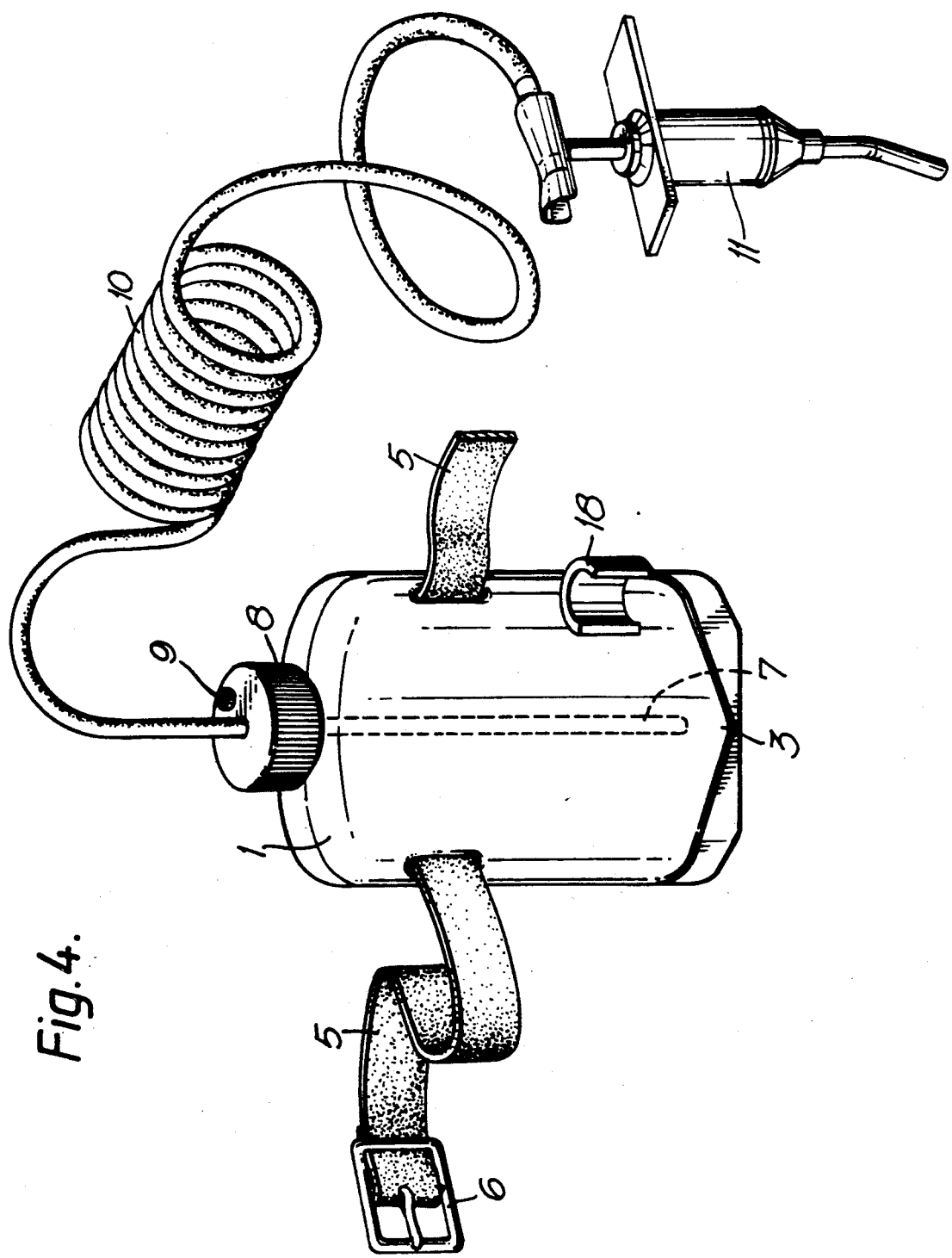
FIG. 4 is a perspective view of the components a first dispensing system with belt, pack clip and delivery system assembled ready for use.
Figure 7:
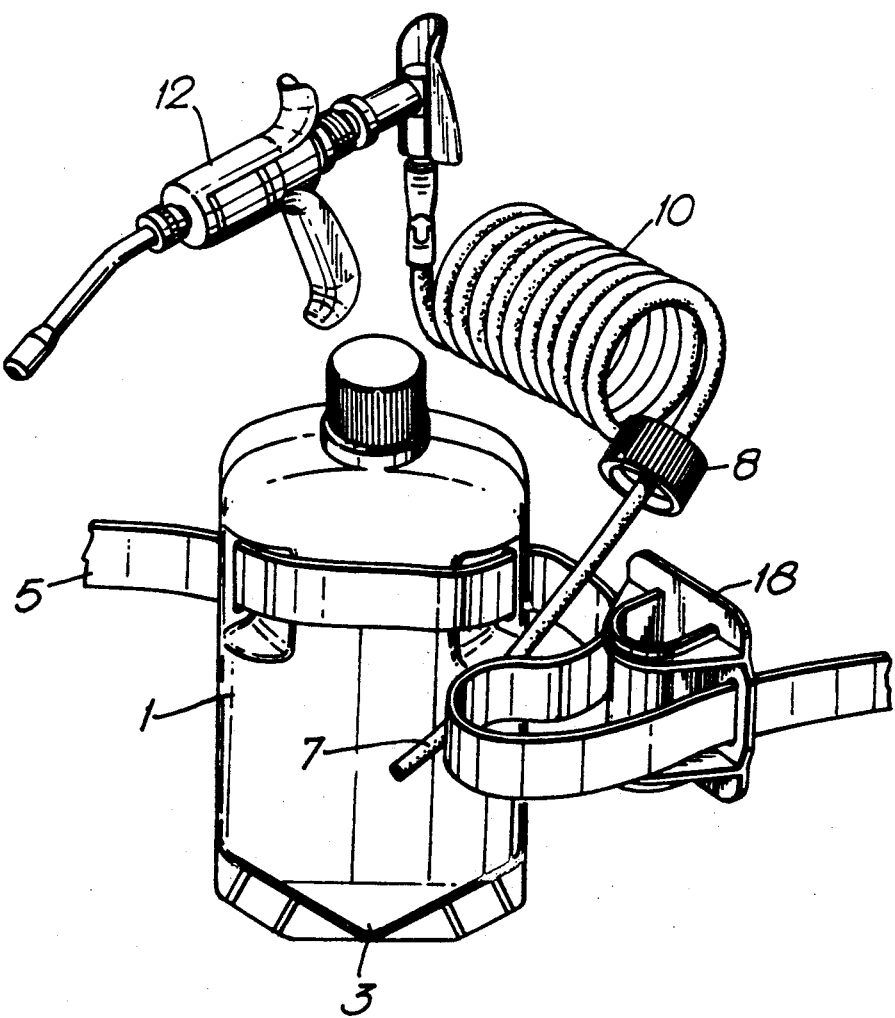
FIG. 7 is a perspective view of a second system according to the invention showing a belt threaded through a holster.

To assemble the system for use as shown in FIG. 4 or 7, the fluid filled sealed pack (1), is attached to a simple belt (5) made from a webbing material. The belt is worn around the waist/hip of the operator being held in place by a buckle (6). In a preferred belt, the buckle is substituted by a clamp-fitting.

The end of a dip-tube (7) is pushed through the neck of the fluid-filled pack (the foil seal, if present having been pierced beforehand) until it reaches the sump (3) which is centrally situated at the bottom of the pack. The upper end of the dip-tube is attached to the brass connector in a draw-off cap (8). The dip-tube is held in place by securing the draw-off cap to the neck (2) of the pack.

The draw-off cap is also connected to a flexible coiled delivery tube (10) so that fluid can pass from the upper end of the dip-tube into the flexible delivery tube. The flexible delivery tube is made of a nylon or similar material. The opposite end of the delivery tube is connected to a syringe (11) as shown in FIG. 4 or an automatic refilling gun (12) (5 ml size) (obtainable from N.J. Phillips Pty Co., Australia) as shown in FIG. 7.

Figure 5:
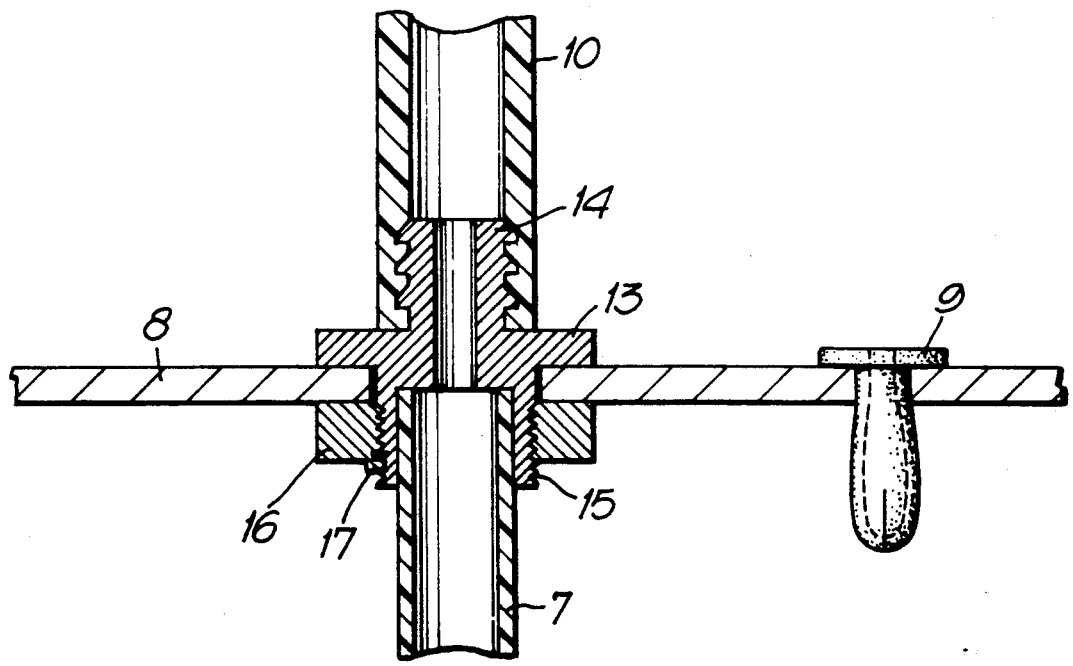
FIG. 5 is a cross-section of part of the top of a draw-off cap fitted with a brass connector.

As shown in FIG. 5, a brass connector (13) is fitted in the draw-off cap (8) to connect the dip tube (7) and the coiled delivery tube (10) to the draw-off cap (8). At one end of the connector is a spigot (14) which is outside the cap when the connector is in place onto which the coiled delivery tube is pushed. The spigot has a ribbed outer surface, which allows the coiled delivery tube to be pushed over it but resists removal of the coiled delivery tube as for example when the tube is pulled.

At the other end of the connector is a cavity (15) into which the dip tube (7) is push fitted. A brass nut (16) is tightened so that the cap will just rotate and then the nut is swaged over (17) to lock the threads together. This allows the operator to rotate the cap on the bottle rather than having to rotate the bottle on the cap.

The draw-off cap is provided with an air inlet with non-return valve such as a split rubber valve (9). Alternatively, the non-return valve can be provided by the remains of the foil seal, if present or a vent of some kind.

In operation, multiple doses of fluid are drawn from the interior of the pack, up the dip-tube and out of the pack through the flexible delivery tube by repeated operation of the syringe or dispensing gun.

When not in use, the syringe (or other suitable administration device) can be attached to the pack by means of a clip (18) as in FIG. 4 or a holster (18) as in FIG. 7. The shape of the clip or holster can be readily adapted to fit the particular dispensing device employed. A clip for attachment of the dispensing device, can alternatively be fitted to holes in the flanges on the pack of FIG. 7 or by a grommet or other attaching means.

Figure 6:
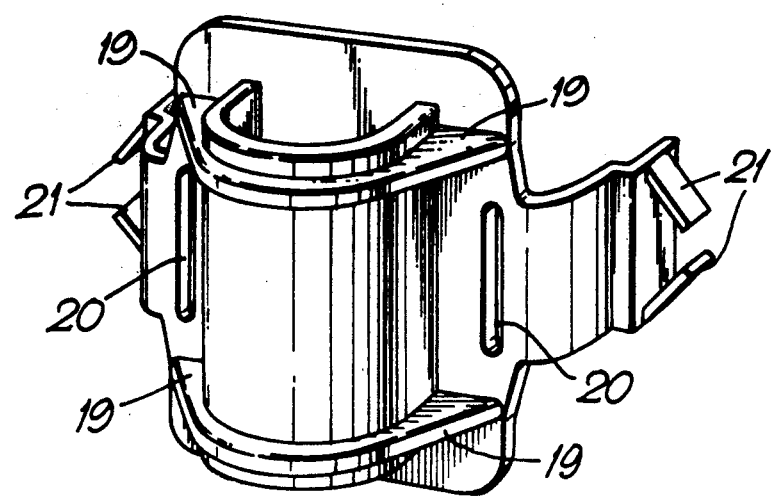
FIG. 6 is a perspective view of a holster for use with a pack.

Views of a holster for use with the pack of FIG. 1 or 2 are shown in FIG. 6. The holster in FIG. 6 is made from injection moulded polypropylene of wall thickness 2 mm, provided with strengthening ribs (19) of 4 mm thickness. The holster has two slots (20) and flexible flaps (21) by which the holster can be retained on the pack. When fitted, the flaps are pushed through the slits on the pack. If desired, the operator can remove the flaps and thread the belt through the slots (20) on the holster as shown in FIG. 7. Optionally, the holster can have flanges which cover the pack slits so that when the belt is passed through the flanges and slits, the holster is retained.

The above describes the invention including a preferred form thereof.

I claim:

1. A portable system for dispensing veterinary fluid materials to livestock comprising a pack for containment of fluid material to be dispensed, dispensing means for administering material from the pack to the livestock, a receptacle for receiving the dispensing means when not in use and means for attaching the pack and receptacle to an operator characterised in that the means for attaching the pack and receptacle to the operator is a belt sized to secure the pack and receptacle around the waist or hip of the operator, wherein the pack has slots or loops for attachment to the belt, said dispensing means including a delivery device and a flexible coil tube formed of nylon connecting the pack to said delivery device, a dip tube coupled to said flexible coil tube for disposition in the pack to transfer fluid out of the pack to the dispensing means, said pack having a sump to accommodate an end portion of the dip tube through which fluid may be transferred from the pack to the dispensing means.

2. A dispensing system according to claim 1 including a drawoff cap with an air inlet means disposed about an opening in the pack.

3. A dispensing system according to claim 2 wherein the drawoff cap is provided with a connection means for the dip tube and delivery tube which is rotatable with respect to the pack whereby the cap can rotate on the pack.

* * * * *